UNITED STATES PATENT OFFICE.

THOMAS McDONALD, OF YOUNGSTOWN, OHIO.

GAS-WASHER.

1,167,909.  Specification of Letters Patent.  Patented Jan. 11, 1916.

Application filed June 1, 1912. Serial No. 700,954.

*To all whom it may concern:*

Be it known that I, THOMAS McDONALD, a citizen of the United States, residing at Youngstown, in the county of Mahoning and State of Ohio, have invented a new and useful Gas-Washer, of which the following is a specification.

My invention relates to the construction and arrangement of gas washers used in the removal of finely divided solids from combustible gases, and the invention more particularly relates to the construction and arrangement of a wet gas washing apparatus in which blast furnace gases are caused to impinge on the surface of a pool or series of pools of a fluid such as water in the gas cleaning operations.

One object of my invention is to provide a gas washer of improved construction having novel means, whereby the gases are brought into contact with the water or other fluid used in removing the finely divided solids carried in suspension in the gases, and by which the surface of the water or other fluid within the washer is kept clean and in condition for effectively removing the solid materials from the constantly flowing stream of gases impinging thereon.

Another object of my invention is to provide a gas washer having improved means whereby the tendency of the stream of gases flowing through the washer to pick up or cause the reëntry into the gases of deposited solids is lessened and reduced.

A further object of the invention is to provide a gas washer having improved means whereby the removal of the deposited solids from the gas washer is facilitated.

A still further object of this invention is to provide a gas washer having improved means whereby the separation of the water and the finely divided solids collected therein from the gases passed through the gas washer is effected and the flue dust or other solids in the water are recovered.

Still further objects of the invention will appear as the invention is more fully described and claimed hereinafter.

Figure 1:
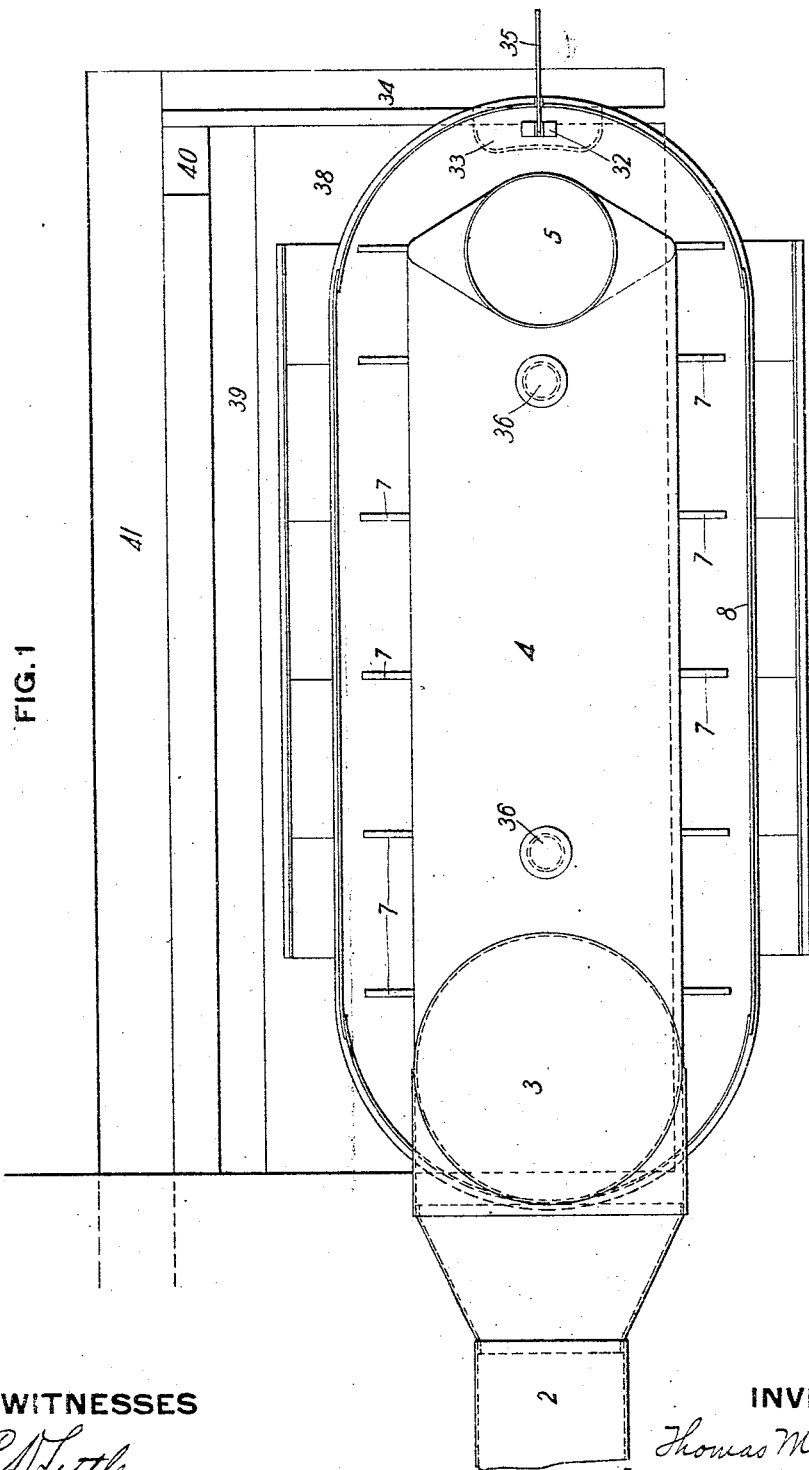
Figure 2:
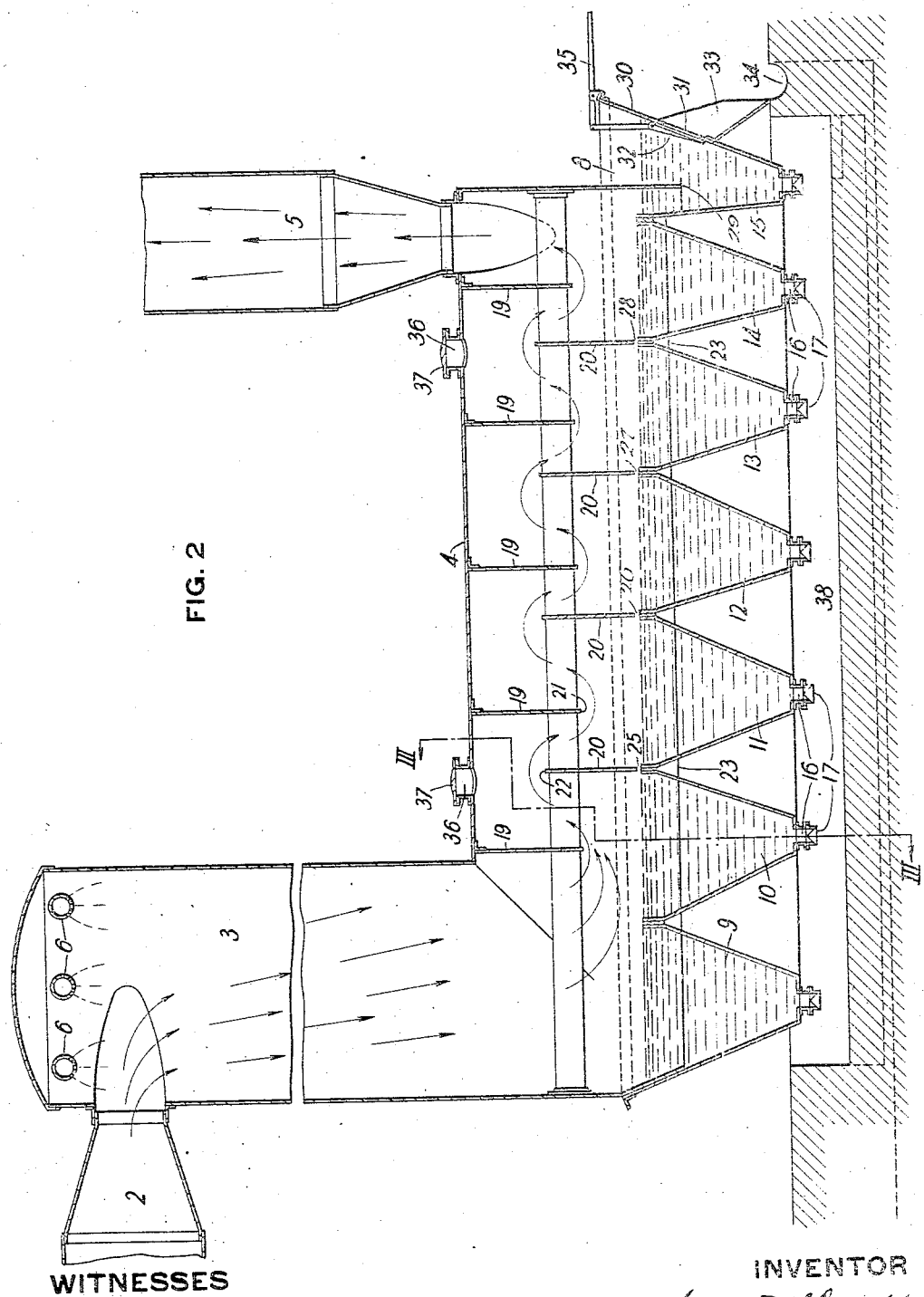
Figure 3:
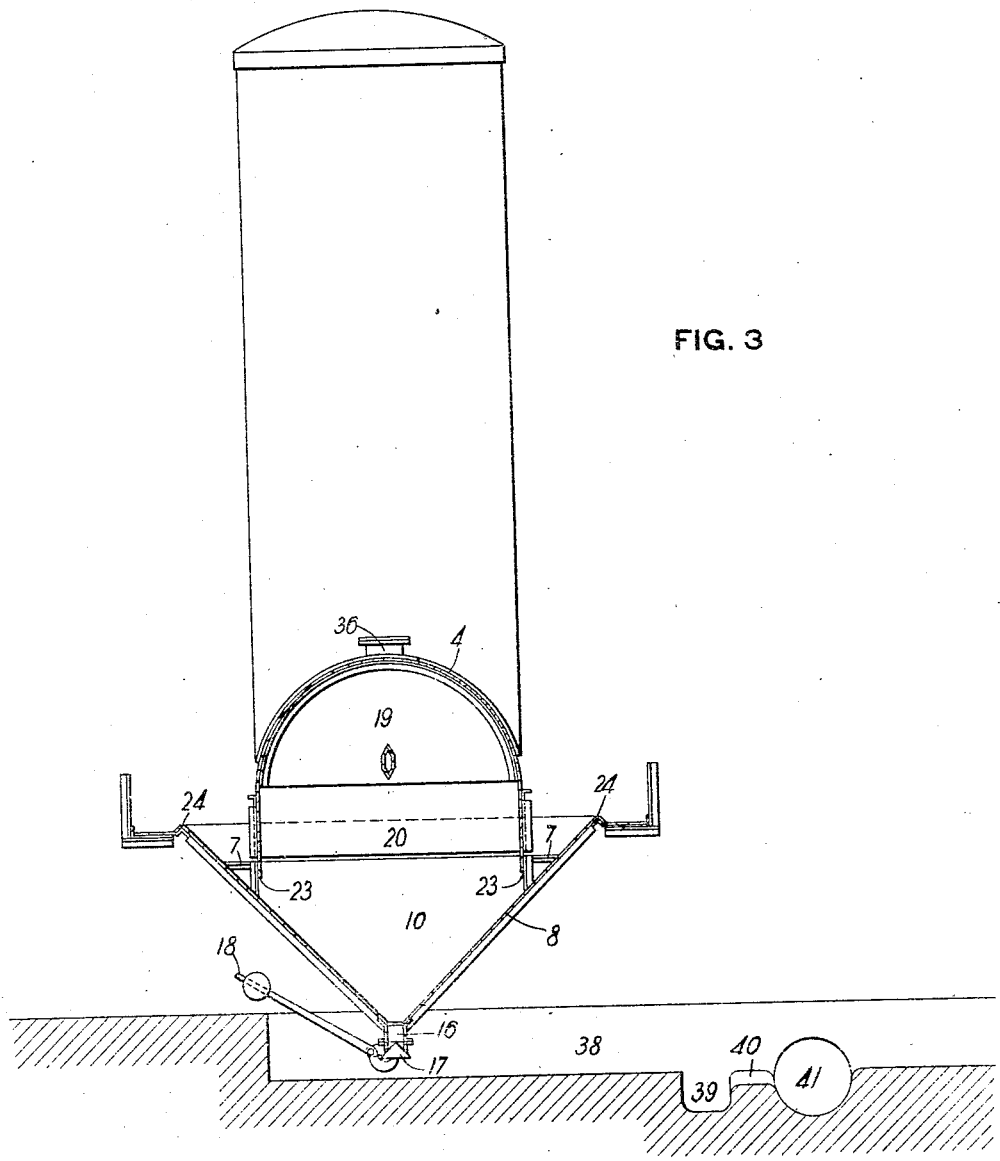

Referring to the accompanying drawings forming part of this specification, Figure 1 is a plan showing a gas washer constructed and arranged in accordance with my invention. Fig. 2 is a longitudinal sectional side elevation of the apparatus shown in Figs. 1 and 2. Fig. 3 is a sectional end elevation of the same, the section being taken on the irregular line III—III of Fig. 2.

In the drawings 2 designates the gas inlet main connected by one end to the upper end of a spray tower 3, the lower end of the spray tower being connected to one end of the cover or top 4 of the horizontal gas washer and one end of an uptake or gas outlet main 5 is connected to the opposite end of the top 4, of the washer. A series of spray pipes 6 are provided in the upper end of the spray tower 3, each having a series of perforations therein, by means of which water in the form of a rain or spray is caused to descend through the spray tower and by mixing with the incoming gases carry therefrom finely divided solids carried in suspension in the gases. The top cover 4, which as shown is semi-cylindrical in cross section, is secured by posts or supports 7 located at intervals in the length of the cover 4 to the trough or bottom section 8 of the horizontal impingement washer.

The bottom section 8 of the impingement washer is formed of a series of pockets 9, 10, 11, 12, 13, 14 and 15, these pockets being formed with downwardly and inwardly sloping sides, each being connected at their converging lower ends to cleaning outlets 16, the outlets being closed normally by means of sealing bells 17. The sealing bells 17 are secured to the gas washer by means of counterweighted lever arms 18, which are at an intermediate point in their length connected to the bottom of the washer.

The well known construction of the cleaning outlets, the bells therefor, and the bell operating levers, not forming part of this invention, is not further described.

Depending within the cover or top 4 of the horizontal gas washer are baffles 19 which extend transversely across the width of the top 4 and secured in the bottom section 8 of the horizontal washer are upwardly extending partitions 20, which likewise extend transversely across the width of the gas washer. The depending baffles 19 alternate with the upwardly extending partitions 20 and the lower horizontal edges 21 of the baffles 19 are some distance below the level of the upper marginal edges 22 of the partitions 20. The horizontal distance between the baffles 19 and the partitions 20 on the left hand or gas entering side of the partitions 20 is greater than the corresponding distance between the partitions 20 and baffles 19 on the right hand or gas discharge side of the partitions. The baffles 19 and partitions 20 are spaced so that the area between the baffles and partitions through which the ascending columns of gases rise to pass over the partitions 20 is greater than the area of the portions of the washer for descending columns of the gases passing under the baffles 19, so as to in this way lessen and overcome the tendency of the gases to pick up or cause the reëntry into the gases of finely divided solids deposited therefrom upon the surface of the water in the gas washer.

By reference to Figs. 2 and 3, it will be seen the lower marginal side edges 23 of the semi-circular top 4, forming the cover for the horizontal gas washer are arranged to extend downwardly within the lower section 8 of the washer to a point below the lowest level at which the water is maintained within the gas washer when the washer is in operation, in such manner as to provide openings which extend lengthwise along each side of the washer between the lower marginal edges of the cover or top 4 and the adjoining surfaces of the bottom section 8 of the washer, the top 4 being narrower than the bottom 8. In this way the water in the gas washer is arranged to form a water seal so as to normally prevent escape of the gases from the washer into the atmosphere through the side openings formed between the lower marginal edges 23 of the top 4 and the upper edges 24 of the bottom section 8 of the washer. The side openings also act to form a relief or safety valve in cases of excessive pressure being formed within the washer as for example that occasioned by slips in the blast furnace to which the gas washer is applied for use, the excessive pressure forcing the water out of the washer and allowing the escape of the gases into the atmosphere until the pressure of the gases again becomes normal.

The lower edge of the partitions 20 with the upper edges of the adjacent side walls of the pockets 10 and 11, 11 and 12, etc. form narrow transversely extending slots or openings 25, 26, 27 and 28, and the upper edge of the adjoining sides of the pockets 10 and 11 defining the lower side of the slot 25 is slightly higher than the corresponding edge of the sides of the pockets 11 and 12. The marginal edge of the adjacent sides of the pockets 11 and 12 is slightly lower than the corresponding part of the adjacent sides of the pockets 10 and 11, and the upper marginal edge of the succeeding pockets likewise are successively lower within the gas washer, so that a series of successively lower levels for the fluid are maintained within the gas washer. The lower edge 29 of the end of the top 4 of the washer extends downwardly within the bottom section 8 of the washer to the same level as the side edges 23 of the top 4. The pockets 9, 10, 11, etc. from left to right also decrease in size successively so that the pocket 10 is somewhat smaller than the pocket 9 and the pocket 15, which is located at the discharge end of the gas washer, is of substantially smaller size than the largest of the pockets 9 (the one located closest to the inlet end of the gas washer). The greatest amount of dust or other finely divided solids being deposited in the first of the pockets and the amount deposited in the last pocket being materially less, the pockets are made progressively smaller so that, in this way, each pocket will become about filled with flue dust in a given period of time.

An overflow outlet 30, which determines the normal level of the water within the pocket 15, is provided at the discharge end of the washer and a sluice 31, which is normally closed by the sluice gate 32 is located on the discharge end of the washer at a lower level than the overflow outlet 30, a trough 33 leading the water discharged therefrom into the drain 34. The sluice gate 32 is connected to one end of the operating handle 35 on the washer by which the gate is opened and closed.

The cover or top 4 for the horizontal gas washer is provided with manholes 36, which are normally closed by means of manhole covers 37.

Below the gas washer is a sump 38 having a trough 39 extending lengthwise along one side thereof, the trough 39 being somewhat deeper than the sump 38 and being connected by a shallower trough or dam 40 to a drain 41 leading to a sewer or other place of discharge for the waste water.

In the operation of my improved apparatus the gases flow from the inlet main 2 into the upper end of the spray tower 3 and, passing downwardly therethrough are caused to impinge on the surface of the water in the pockets 9 and 10 of the horizontal washer, the inflowing column of gases being sprayed with water discharged from the spray pipes 6 in the top of the spray tower 3 in passing through the spray tower 3. The downwardly flowing gases are deflected by striking the surface of the water in the pockets 9 and 10 and are caused to rise upwardly and pass around the first of the partitions 20 and then in under and around the first depending baffle 19. The column of gases is caused to travel through a tortuous path by means of the baffles 19 and partitions 20, the gases descending and impinging on the surface of the water and ascending to pass over a partition 20 until the opposite end of the horizontal washer is reached, when the cleaned gases rise upwardly and pass out of the washer through the gas offtake 5.

The heaviest particles of the solids in the gases, which are wetted in the spray tower 3, will be deposited first within the washer and successively finer particles of the solids carried in suspension in the gases will be deposited in each successive pocket. A foam or scum is formed on the surface of the water within the washer by the solid materials deposited by the impinging stream of gases on the water so that, unless removed as formed, this scum retards the cleaning effect of the water and lessens the efficiency of the washer. By means of my improved construction the scum as formed will be carried by the water flowing over the upper edges of the pockets through the slots or transverse openings 25, 26, etc., into the last pocket 15, in this way keeping the surface of the water comparatively clean and free from scum.

After the washer has been in operation for a sufficient length of time as to necessitate cleaning of the pockets in the bottom 8 of the washer, the sluice gate 32 is opened and the major portion of the water in the pocket 15 is drained off, this operation also removing the accumulated scum collected in the last pocket 15. The cleaning bell 17 on the cleaning opening 16 on each pocket 9, 10, etc., is then opened so as to empty the pocket, the relatively small amount of water then remaining in each pocket being sufficient to carry the sludge or pasty mixture of water and solids out of the pockets through the cleaning outlet 16 into the sump 38. As the sump 38 becomes filled with the mixture of water and finely divided solids from the pockets of the gas washer, the water therein will flow over the dam 40 and the solid materials, being heavy, will become deposited within the sump 38 and deeper trough 39, the water passing over the dam 40 flowing into the drain 41 which leads to the sewer or other point of disposal. The finely divided solids or flue dust deposited in the sump 38 and trough 39 will be removed from time to time in a condition in readiness to be again used or stored for future use, and the amount of flue dust or solid materials carried away by the water in cleaning the washer will be very materially reduced.

The advantages of my invention will be apparent to those skilled in the art. The blast furnace or other combustible gases being cleaned are intimately mixed with water introduced thereinto in a spray and the gases are then caused to repeatedly impinge upon the surfaces of the water in the successive pockets of the gas washer. The scum as formed on the surface of the water is automatically carried from one pocket to the next by the current of water constantly flowing through the washer from one to the adjoining pocket, and in this way the surface of the water is kept clear and free to contact with the fresh gases entering the washer.

The arrangement of the baffles and partitions so as to form passages in which the passages for the ascending gases are smallest provides means whereby reëntry of solids on the surface of the water into the gases passing through the water is prevented and overcome.

The arrangement of a series of separate and independent pockets in which the solids are deposited provides means for cleaning one portion of the washer independently of the other with a minimum waste of water.

The sump and the arrangement of troughs beneath the gas washer provide novel means for separating the flue dust and water discharged from the washer and lessen and overcome the loss of large quantities of flue dust heretofore carried away by the waste water.

Modifications in the construction and arrangement of the parts may be made without departing from my invention as defined in the claims.

I claim:—

1. A gas washer comprising a washing chamber having gas inlet and outlet openings therein and having means for supplying liquid thereto, means for maintaining separate pools of liquid in the chamber, and a partition in said chamber arranged to permit passage of gases in the upper portion of the chamber, said partition having a transverse opening in the lower portion thereof arranged to permit passage of liquid and gases past said partition and maintain the pools at successively lower levels within the chamber.

2. A gas washer comprising a washing chamber having gas inlet and outlet openings therein and having means for supplying liquid thereto, means for maintaining separate pools of liquid in said chamber, an upwardly extending partition in the chamber alternating with a downwardly extending baffle depending from the top of the chamber and arranged to permit passage of gases over the partition and under the baffle, said partition having an opening in the lower portion thereof arranged to permit passage of liquids and gases from one side to the other of the partition, said opening forming an overflow outlet to determine the level of the liquid therein.

3. A gas washer comprising a washing chamber having gas inlet and outlet openings therein and having means for supplying liquid thereto, means for maintaining separate pools of liquid in the chamber, a plurality of upwardly extending partitions in the chamber alternating with downwardly extending baffles depending from the top of said chamber, said partitions and baffles being arranged to permit passage of gases over the partitions and under the baffles, and said partition having openings forming overflow outlets in the lower portion thereof arranged to permit passage of liquid and gases from one side to the other of the partition and regulate the height to which the liquid is maintained in said pools at successively lower levels.

4. A gas washer comprising a washing chamber having gas inlet and outlet openings therein and having means for supplying liquid thereto, means for maintaining separate pools of liquid therein, a series of upwardly extending partitions and depending baffles in said chamber, said baffles being located between the partitions and the partitions terminating below the top of the chamber and having transverse openings in the lower portion thereof forming passages for liquid and gases through the partitions and an overflow outlet opening for the liquids.

5. A gas washer comprising a chamber having gas inlet and outlet openings therein and having means for supplying liquid thereto, a plurality of upwardly extending partitions in the chamber, a plurality of downwardly extending baffles in said chamber, said partitions and baffles being relatively arranged to permit passage of gases over the partitions and under the baffles, said partitions having openings in the lower portion thereof arranged to permit passage of liquids from one side to the other of the upwardly extending baffles, the lower marginal edge of said openings being at successively lower levels.

6. A gas washer comprising a washing chamber having gas inlet and outlet openings therein and having means for supplying liquid thereto, means for maintaining separate pools of liquid therein, a series of upwardly extending partitions and depending baffles in said chamber, said baffles being located between the partitions and the partitions terminating below the top of the chamber and having transverse openings in the lower portion thereof forming passages for liquid and gases through the partitions, and a sluice having a closing gate thereon below the level of said overflow outlet openings.

7. A gas washer comprising a washing chamber having a gas inlet and outlet opening therein, and having means for supplying liquid thereto, means for maintaining separate pools of liquid therein, a series of upwardly extending partitions and depending baffles in said chamber, said baffles being located between the partitions, to form compartments larger on the gas receiving side than on the gas discharging side thereof, and the partitions terminating below the top of the chamber and having transverse openings in the lower portion thereof forming a passage for liquid and gases through the partitions at the level of the liquid.

In testimony whereof, I have hereunto set my hand.

THOMAS McDONALD.

Witnesses:
 WARREN F. PERRY,
 H. JAMES LITTLE.